United States Patent [19]

Kightlinger et al.

[11] Patent Number: 4,769,414

[45] Date of Patent: Sep. 6, 1988

[54] ABSORBENT COMPOSITIONS

[75] Inventors: Adrian P. Kightlinger; Robert B. Huston, both of Muscatine, Iowa

[73] Assignee: Grain Processing Corporation, Muscatine, Iowa

[21] Appl. No.: 904,925

[22] Filed: Sep. 8, 1986

[51] Int. Cl.$^4$ .................... C08F 16/06; C08F 116/06
[52] U.S. Cl. ................. 525/54.24; 525/54.2; 525/54.26
[58] Field of Search ............. 527/512; 526/238.2, 526/238.21, 238.22, 238.23; 525/54.2, 54.21, 54.22, 54.23, 54.24, 54.26, 329.1, 329.2, 329.3, 369

[56] References Cited

U.S. PATENT DOCUMENTS

| | | | |
|---|---|---|---|
| 3,661,815 | 5/1972 | Smith | 525/54.32 |
| 4,497,930 | 2/1985 | Yamasaki et al. | 526/238.22 |
| 4,558,100 | 12/1985 | Kightlinger et al. | 525/329.1 |

*Primary Examiner*—Delbert R. Phillips
*Assistant Examiner*—Nathan M. Nutter
*Attorney, Agent, or Firm*—Neuman, Williams, Anderson & Olson

[57] ABSTRACT

Improved liquid absorbent products comprising saponified polymers or copolymers or starch graft copolymers of 2-propenenitrile or 2-methyl-2-propenenitrile which exhibit a white appearance. The products are produced by the use of an oxidizing agent or a reducing agent or a combination of an oxidizing agent and a reducing agent.

16 Claims, No Drawings

ABSORBENT COMPOSITIONS

This invention relates to improvements in compositions which have the ability to absorb substantial amounts of aqueous liquids.

Compositions which are capable of absorbing large amounts of liquids find numerous uses. For example, such absorbents are used to form absorbent products such as sanitary napkins, incontinent pads, disposable bed pads, diapers, wound dressings, surgical drapes and other personal care items. Liquid absorbing compositions also find use in fuel filters, seed coatings, batteries, freezer packs and other applications.

Water absorbing alkali metal salts of saponified granular starch-graft-poly(2-propenenitrile) copolymers are disclosed in U.S. Pat. No. 3,661,815. These products are prepared by saponifying starch-graft-poly(2-propenenitrile) copolymers in an aqueous alcoholic solution of an alkali metal base. These materials are substantially water-insoluble granular products having the capacity to absorb aqueous liquids. Because of their absorbing characteristics, the products disclosed in that prior patent have been utilized commercially in a wide variety of applications.

Other alkali metal carboxylate salts of saponified starch-graft-poly(2-propenenitrile) copolymers are disclosed in U.S. Pat. No. 4,069,177. These are produced by saponifying a starch-graft-polyacrylonitrile copolymer prepared utilizing a step-wise grafting process and by employment of starch which has been treated by one or more of the following steps: thinning, defatting, precooking.

Similarly, U.S. Pat. No. 4,558,100 discloses compositions which exhibit the capacity to absorb substantial quantities of aqueous liquids, including body fluids. The compositions disclosed in that patent are alkali metal salts of an aqueous alcoholic saponified cross-linked polymer of 2-propenenitrile or 2-methyl-2-propenenitrile. As defined in said patent, and as used herein, a superabsorbent is a material capable of absorbing substantial quantities of a liquid, i.e. more than 15 parts liquid per part thereof.

Generally speaking, higher quality absorbents from the standpoint of absorbency are produced when saponified using an aqueous alcoholic solution of an alkali metal base as disclosed in U.S. Pat. Nos. 3,661,815, 4,069,177 and 4,558,100, the disclosures of which are incorporated herein. However, saponification of the polymers, copolymers or starch graft copolymers can be accomplished using an aqueous solution of a base only, without the presence of an alcohol as taught, for example, in U.S. Pat. Nos. 3,425,971, 4,221,684, 4,045,387 and 4,204,983. Despite variations in procedures, saponification of polymers, copolymers and graft copolymers is generally carried out using aqueous solutions of a base, such as sodium or potassium hydroxide, and the saponified polymers are recovered from the aqueous slurry and dried. The term "saponification" as used herein refers to this procedure in general.

The particular method used for preparing the base polymers, copolymers or graft copolymers and for the saponification thereof are not critical with respect to realizing the advantages of this invention. Methods well known in the art with respect to the preparation of poly(2-propenenitrile) polymers or graft copolymers thereof with starch, modified and/or derivatized starch, cellulose, derivatized cellulose and other carbohydrate polymers with 2-propenenitrile can be used. Thus, the base non-saponified polymers, copolymers and graft copolymers can be prepared in accordance with procedures known in the art, such as described in U.S. Pat. Nos. 2,861,059, 2,922,768 and 3,201,336.

A substantial shortcoming of the known saponified starch-graft-poly(2-propenenitrile) and poly(2-propenenitrile) polymer absorbents is the presence of a light tan color which limits their usage in certain applications.

Now, we have discovered that saponified polymeric 2-propenenitrile based absorbents can be produced so as to be substantially free of color and have a substantially white appearance. The present invention involves the process of saponifying with an aqueous base a polymer or copolymer or starch graft copolymer of 2-propenenitrile or 2-methyl-2-propenenitrile and before drying the saponified product treating with an oxidizing agent or a reducing agent or a combination of an oxidizing agent and a reducing agent. The improved liquid absorbent products of this invention comprise saponified polymers or copolymers or starch graft copolymers consisting substantially of 2-propenenitrile or 2-methyl-2-propenenitrile and exhibit a white appearance, i.e., exhibit luminosity values (L) of not less than 90.0 and/or a yellowness index (YI) no greater than 26.0 as determined using a Hunter Color Difference Meter, Model D25-2.

As used herein, the term "polymer" or "copolymer" means homopolymers and copolymers or crosslinked homopolymers and copolymers consisting substantially of 2-propenenitrile and 2-methyl-2-propenenitrile. Similarly, the term "graft copolymers" refers to graft copolymers of starch or crosslinked graft copolymers of starch, said grafted portion consisting substantially of 2-propenenitrile or 2-methyl-2-propenenitrile. The invention can also be advantageously utilized with copolymers and graft copolymers of 2-propenenitrile or 2-methyl-2-propenenitrile with other vinyl monomers.

In accordance with this invention, oxidizing and/or reducing agents are used to significantly reduce the color of saponified polymers, copolymers or graft copolymers. A variety of treating schemes have been found suitable for practicing the invention. Several treating schemes have been found suitable for practicing the invention. These include:

(a) use of a reducing agent in the saponification reaction mixture prior to the time the saponification reaction is substantially complete and prior to drying of the saponified product, (b) use of a reducing agent subsequent to the time the saponification reaction is substantially complete and prior to drying, (c) use of a reducing agent both prior to and subsequent to substantial completion of the saponification reaction and prior to drying, (d) use of a reducing agent prior to and/or after substantial completion of the saponification reaction and prior to drying and use after substantial completion of the saponification reaction of a peroxy oxidizing agent, and (e) use after substantial completion of the saponification reaction of hydrogen peroxide.

When an agent is used in the saponification reaction mixture prior to substantial completion of saponification, it is referred to herein as a "pre-saponification additive" and when used after substantial completion of the saponification and before drying of the saponified product it is referred to as a "post-saponification additive".

The amount of reducing agent to be used either as a "pre-saponification additive" or "post-saponification additive" generally ranges from about 0.05 to 20% or more, preferably 0.1 to 10% by weight, based upon the polymer, copolymer or graft copolymer undergoing saponification. Multiple additions of the reducing agent can also be employed to obtain the desired color reduction. The polymer or copolymer is contacted with the reducing agent for a period ranging from minutes up to 24 hours at temperatures ranging from about 10° C. to 150° C. and preferably 30° C. to 120° C.

Suitable representative reducing agents that can be used include the sulfoxy compounds such as the bisulfites, metabisulfites, hydrosulfites, thiosulfites and the like. Particularly preferred reducing agents are sodium hydrosulfite, sodium metabisulfite, sodium bisulfite, sodium formaldehyde bisulfite, sodium thiosulfate and sodium formaldehyde sulfoxylate.

Oxidizing agents can also be employed in accordance with this invention to achieve reduction in color of the saponified absorbent materials. We have found that peroxy oxidizing agents can be advantageously employed as a "post-saponification additive" in connection with use of a reducing agent as a "pre-saponification additive". The oxidizing agent, hydrogen peroxide, can be used alone as a "post-saponification additive" regardless of whether a reducing agent was employed prior to completion of the saponification reaction. In all cases, the amount of oxidizing agent utilized ranges from about 0.01 to 30% and preferably from about 0.2 to 20% by weight of the polymer, copolymer or graft copolymer. Multiple additions of the oxidizing agent may also be used to obtain the desired reduction in color. Contact of the saponified polymer or copolymer with the oxidizing agent is conducted at a temperature of from 10° C. to 150° C. and preferably 30° C. to 120° C. for periods ranging from minutes up to 24 hours.

Suitable representative oxidizing agents include organic and inorganic peroxides, persulfates and perborates. Particularly preferred oxidizing agents are hydrogen peroxide, sodium peroxide, potassium monosulfate, ammonium persulfate, potassium persulfate, sodium perborate, and potassium perborate.

Sequential use of the reducing agent and an oxidizing agent can be practiced with advantage. Various combinations of reducing agents and peroxy oxidizing agents can be employed. An especially preferred combination is sodium hydrosulfite and hydrogen peroxide. Sodium hydrosulfite usage in the preferred combination preferably ranges from 0.05 to 20% and more preferably from 0.1 to 10% by weight of the polymer, copolymer or graft copolymer and hydrogen peroxide usage ranges from about 0.01 to 30% and preferably 0.2 to 20% by weight (same basis).

Although our discussion has centered upon the preparation of saponified superabsorbent polymers and graft copolymers having improved color, it will be apparent to those skilled in the art that other saponified polymers and graft copolymers, superabsorbent or otherwise, having improved color can be obtained by practice of the present invention.

It will also be obvious to one skilled in the art that the presence of potentially colored auxiliary chemicals may require that a single treatment, or the last treatment in a sequence, be either oxidizing or reducing to insure that said auxiliary chemical in the final product is in a non-colored form.

The following examples illustrate the invention and the advantages thereof. In these examples the liquid uptake of the superabsorbent polymers is measured by adding the test liquid (water, aqueous 1% sodium chloride - w/v, etc.) portion-wise to a weighed amount of polymer in a 200 milliliter tall form beaker with gentle hand stirring using a spatula. The minimum volume of liquid which gives product gel flow when the beaker is inverted is taken as the liquid uptake.

The Hunter Color Value is obtained using a Hunter Color Difference Meter, Model D25-2, in accordance with use instructions. The Hunter Color Value is defined using two measurements—the L value on luminosity on a scale of 0 (black) to 100 (white) (whiteness) and the YI value or yellowness index with respect to a yellow standard. The L and YI values are directly related to the numerical value; e.g. whiteness increases with the L value and yellowness increases with the YI number. In practice, a high L value and a low YI value are desired.

COMPARATIVE EXAMPLE 1

A conventional crosslinked poly(2-propenamide-co-2-propenoic acid, sodium salt) superabsorbent polymer was prepared using the following general procedures.

An aqueous crosslinked poly(2-propenenitrile) slurry (14.9% polymer solids based upon total slurry weight) was treated with 12.0% sodium hydroxide (sodium hydroxide; added as an aqueous 50% solution, w/w) and 139.6% methanol (both percentages are based upon the polymerization slurry weight). The alkaline slurry was heated with agitation to approximately 100° C. and maintained at this temperature for two hours. At the end of the two-hour hold, the reaction slurry was cooled to room temperature and the crosslinked poly(2-propenamide-co-2-propenoic acid, sodium salt) superabsorbent polymer was recovered in methanol, pH adjusted to 7.0–7.5 using hydrochloric acid, filtered and the wet cake dried.

The finished dry superabsorbent polymer was light tan in color. The Hunter Color Difference Meter showed a luminosity (L; whiteness) reading of 88.0 and a yellowness index (YI) of 29.3. The material absorbed 518 milliliters of distilled water or 94 milliliters of an aqueous 1% sodium chloride (NaCl) solution (per gram of as is superabsorbent) as measured by the beaker uptake procedure.

Although this product has excellent absorbency characteristics, the tan color would be objectionable in most personal care items.

EXAMPLE 1

A series of crosslinked poly(2-propenamide-co-2-propenoic acid, sodium salt) superabsorbent polymers was prepared as described in Comparative Example 1 except that various oxidizing agents and reducing agents were incorporated into the reaction slurry prior to saponification.

Hunter Color Difference Meter results summarized in the following Table 1 show:

1. Sodium hydrosulfite (a reducing agent) reduced the color of finished product when compared with the results obtained in Comparative Example 1. The effect of the hydrosulfite varied with a plateau occurring at the 3–5% by weight use level.

2. Benzoyl peroxide had no desirable effect upon the superabsorbents color.

3. Ammonium persulfate caused a very significant and undesirable discoloration.

TABLE 1

| Sample | Pre-Saponification Additive Identification | % (1) | Hunter Color Value (2) L | YI |
|---|---|---|---|---|
| 1 | Sodium hydrosulfite | 1.69 | 89.1 | 26.9 |
| 2 | Sodium hydrosulfite | 3.02 | 92.0 | 20.6 |
| 3 | Sodium hydrosulfite | 5.07 | 91.7 | 21.0 |
| 4 | Benzoyl peroxide | 5.07 | 86.7 | 31.5 |
| 5 | Ammonium persulfate | 4.47 | Very dark brown | |

(1) % based on the poly(2-propenenitrile) dry solids
(2) obtained from a Hunter Color Difference Meter Moded D25-2

EXAMPLE 2

A series of crosslinked poly(2-propenamide-co-2-propenoic acid, sodium salt) superabsorbent polymers was prepared as described in Comparative Example 1 except that the following (Post-Saponification) step was incorporated into the procedure after cooling the reaction slurry but before recovery:

The cooled reaction slurry was treated with either an oxidizing agent or a reducing agent and then heated to 50°–100° C. (see following table for details) and held at the indicated temperature for about 30 minutes. The treated reaction slurry was then cooled to room temperature and recovered as described in Comparative Example 1.

Hunter Color Difference Meter results, summarized in the following Table 2, show the post-saponification treatment with:

1. Sodium hydrosulfite improved the color of the finished dry product when compared to results in Comparative Example 1.

2. Hydrogen peroxide resulted in a small improvement in color. The improvement was, however, less than noted above for the hydrosulfite treatment.

TABLE 2

| Sample | Post-Saponification Additive Identification | % (1) | Reaction Temp., °C. | Hunter Color Value L | YI |
|---|---|---|---|---|---|
| 6 | Sodium Hydrosulfite | 1.69 | 100 | 91.1 | 23.1 |
| 7 | Sodium Hydrosulfite | 3.38 | 100 | 89.6 | 24.8 |
| 8 | Sodium Hydrosulfite | 8.51 | 100 | 89.9 | 21.8 |
| 9 | Hydrogen Peroxide | 8.05 | 50 | 90.2 | 26.0 |
| 10 | Hydrogen Peroxide | 8.05 | 90 | 90.1 | 25.8 |

(1) % based on the poly(2-propenenitrile) dry solids

EXAMPLE 3

A crosslinked poly(2-propenamide-co-2-propenoic acid, sodium salt) superabsorbent polymer was prepared as described in Comparative Example 1 except that the following (Post-Saponification) steps were incorporated into the procedure after cooling the reaction slurry but before recovery:

The cooled reaction slurry was treated with sodium hydrosulfite [3.41% based on the poly(2-propenenitrile) dry solids] and then heated to 100° C. and held for 30 minutes before cooling to 30° C.

The cooled hydrosulfite treated reaction slurry was then treated with hydrogen peroxide [8.05% based on the poly(2-propenenitrile) dry solids] and heated to 50° C. and held for 30 minutes. The resultant reaction slurry was then cooled to room temperature and recovered as described in Comparative Example 1.

Hunter Color Difference Meter results showed a luminosity (L) of 90.8 and a yellowness index (YI) of 22.9. Both values are significantly better than noted for Comparative Example 1.

EXAMPLE 4

A series of crosslinked poly(2-propenamide-co-2-propenoic acid, sodium salt) superabsorbent polymers was prepared as described in Comparative Example 1 except that:

1. Varying amounts of sodium hydrosulfite were incorporated into the reaction slurry prior to saponification.

2. Various oxidizing agents and reducing agents were employed in the post-saponification treatment described in Example 2.

Hunter Color Difference Meter results, summarized in the following Table 3, show that:

1. Sodium hydrosulfite incorporated pre- and post-saponification resulted in a significant improvement in color when compared with the data in Comparative Example 1. The dual treatment was also better than the single pre- or post-saponification treatment described in Example 1 (Samples 1–3) and Example 2 (Samples 6–8).

2. Particularly good results were obtained when the sodium hydrosulfite pretreatment was combined with the post-saponification hydrogen peroxide treatment. The increased whiteness (L value) and reduced yellowish cast (lower YI) was immediately obvious. White superabsorbents of this type readily meet the color requirements for most personal care items.

TABLE 3

| Sample | Pre-Saponification Additive Identification | % (1) | Post-Saponification Additive Identification | % (1) | Reaction Temp. °C. | Hunter Color Value L | YI |
|---|---|---|---|---|---|---|---|
| 11 | Sodium Hydrosulfite | 3.38 | Sodium Hydrosulfite | 3.38 | 100 | 92.2 | 18.1 |
| 12 | Sodium Hydrosulfite | 3.38 | Hydrogen Peroxide | 8.05 | 50 | 94.0 | 18.2 |
| 13 | Sodium Hydrosulfite | 1.69 | Hydrogen Peroxide | 8.05 | 50 | 93.7 | 16.9 |

(1) % based on the poly(2-propenenitrile) dry solids

EXAMPLE 5

A crosslinked poly(2-propenamide-co-2-propenoic acid, sodium salt) superabsorbent polymer was prepared in a manner similar to that of Sample #12 except that the water methanol ratio used in the saponification process was changed from 41/59 to 56/44 (w/w).

Hunter Color Difference Meter values summarized in the following Table 4 show that a significant improvement in color is obtainable over a wide range of water/methanol ratios when compared to Comparative Example 1.

TABLE 4

| Sample | H₂O/MeOH | Pre-Sapoinification Additive Identification | % (1) | Post-Saponification Additive Identification | % (1) | Reaction Temp. °C. | Hunter Color Value L | YI |
|---|---|---|---|---|---|---|---|---|
| 12 | 41/59 | Sodium Hydrosulfite | 3.38 | Hydrogen Peroxide | 8.05 | 50 | 94.0 | 18.2 |
| 14 | 56/44 | Sodium Hydrosulfite | 3.38 | Hydrogen Peroxide | 8.05 | 50 | 92.6 | 22.9 |

(1) % based on the poly(2-propenenitrile) dry solids

COMPARATIVE EXAMPLE 2

An aqueous crosslinked starch-graft-poly(2-propenenitrile) copolymer slurry (10.5% polymer solids based upon total slurry weight) prepared using procedures known to those skilled in the art, was treated with 7.02% sodium hydroxide (added as an aqueous 50% solution w/w) and 69.3% methanol (both percentages are based upon the initial copolymer slurry weight). The alkaline slurry was heated, with agitation, to approximately 100° C. and maintained at this temperature for two hours. At the end of the two-hour hold the reaction slurry was cooled to room temperature and the crosslinked starch-graft-poly(2-propenamide-2-propenoic acid copolymer, sodium salt) superabsorbent polymer recovered in methanol, pH adjusted to 7.0 to 7.5 using hydrochloric acid, filtered and the wet cake dried.

The finished dry superabsorbent starch graft copolymer was light tan in color. The Hunter Color Difference Meter showed a luminosity (L; whiteness) reading of 82.9 and a yellowness index of 28.4. The superabsorbent polymer absorbed 780 milliliters distilled water or 97 milliliters of an aqueous 1.0% sodium chloride solution per gram of as is polymer as measured by the beaker uptake procedure.

Although this product has excellent absorbency characteristics, the tan color would preclude its use in most personal care items.

EXAMPLE 6

A series of crosslinked starch-graft-poly(2-propenamide-co-2-propenoic acid, sodium salt) superabsorbent polymers was prepared as described in Comparative Example 2 except that various oxidizing agents and reducing agents were incorporated into the reaction slurry prior to saponification.

Hunter Color Difference Meter results, summarized in Table 5, show that:

1. Sodium hydrosulfite did improve the color of the superabsorbent starch graft copolymer somewhat at the lower level. Higher levels of sodium hydrosulfite, however, produced a significant improvement in color.

2. Hydrogen peroxide significantly increased the color of the finished superabsorbent.

TABLE 5

| Sample | Pre-Saponification Additive Identification | % (1) | Hunter Color Value L | YI |
|---|---|---|---|---|
| 15 | Sodium Hydrosulfite | 3.36 | 84.4 | 24.5 |
| 16 | Sodium Hydrosulfite | 10.22 | 91.8 | 10.5 |
| 17 | Hydrogen Peroxide | 8.03 | Very dark brown | |

(1) based on the starch-graft-poly(2-propenenitrile) dry solids

EXAMPLE 7

Crosslinked starch-graft-poly(2-propenamide-co-2-propenoic acid, sodium salt) superabsorbent polymers were prepared as described in Comparative Example 2 except:

1. Sodium hydrosulfite [1.46% based upon the starch-graft-poly(2-propenenitrile) dry solids] and hydrogen peroxide (8.00% same basis) were substantially simultaneously incorporated into the pre-saponification slurry. The resultant reaction slurry was saponified at 100° C. for two hours and then recovered.

2. The cooled, post-saponification slurry was treated substantially simultaneously with sodium hydrosulfite [1.46% based upon the starch-graft-poly(2-propenenitrile) dry solids] and hydrogen peroxide (8.00% same basis) and then heated to 50° C. for 30 minutes before cooling and recovered.

Results, summarized in Table 6, show that: The post-saponification treatment gave significantly better results than the pre-saponification treatment.

TABLE 6

| Sample | Pre-Saponification Additive Identification | % (1) | Post-Saponification Additve Identification | % (1) | Time (min) | Temp. (°C.) | Hunter Color Value L | YI |
|---|---|---|---|---|---|---|---|---|
| 18 | Sodium Hydrosulfite plus Hydrogen Peroxide | 1.46  8.00 | | | 120 | 100 | 74.0 | 72.0 |
| 19 | | | Sodium Hydrosulfite plus Hydrogen Peroxide | 1.46  8.00 | 30 | 50 | 92.5 | 21.8 |

(1) % based on the starch-graft-poly(2-propenenitrile) dry solids

EXAMPLE 8

A series of crosslinked starch-graft-poly(2-propenamide-co-2-propenoic acid, sodium salt) superabsorbent polymers was prepared as described in Comparative Example 2 with the following exceptions:

1. Varying amounts of sodium hydrosulfite were incorporated into the reaction slurry prior to saponification.
2. Various oxidizing agents were employed in the post-saponification treatment outlined in Example 6.

Results summarized in Table 7 show that:

1. A sodium hydrosulfite pre-saponification treatment coupled with post-saponification treatments with various oxidizing agents such as hydrogen peroxide, sodium peroxide, benzoyl peroxide, potassium monopersulfate, sodium perborate and ammonium persulfate produced exceptionally white products when compared with Comparative Example 2.
2. The yellowness was reduced as the level of hydrosulfite was increased.
3. The action of hydrogen peroxide post treatment when combined with a sodium hydrosulfite pretreatment gave very good results.

EXAMPLE 9

A series of crosslinked starch-graft-poly(2-propenamide-co-2-propenoic acid, sodium salt) superabsorbent polymers was prepared as described in Example 8 except that various reducing agents were incorporated into the reaction slurry prior to saponification.

Results summarized in Table 8 show that significant improvement in color is obtainable with a wide variety of reducing agents used in the pre-saponification treatment coupled with a hydrogen peroxide post-saponification treatment, when compared to Comparative Example 2.

TABLE 8

| Sample | Pre-Saponification Additive Identification | % (1) | Post-Saponification Additive Identification | % (1) | Reaction Temp. °C. | Hunter Color Value L | YI |
|---|---|---|---|---|---|---|---|
| 31 | Sodium Formaldehyde Bisulfite | 1.12 | Hydrogen Peroxide | 8.09 | 50 | 93.3 | 22.0 |
| 32 | Sodium Formaldehyde Sulfoxylate | 1.28 | Hydrogen Peroxide | 8.09 | 50 | 93.3 | 17.7 |
| 33 | Sodium Metabisulfite | 1.59 | Hydrogen Peroxide | 8.09 | 50 | 92.6 | 17.4 |
| 34 | Sodium Thiosulfate | 1.33 | Hydrogen Peroxide | 8.09 | 50 | 92.0 | 21.7 |

(1) % based on the starch-graft-poly(2-propenenitrile) dry solids

EXAMPLE 10

A series of crosslinked starch-graft-poly(2-propenamide-co-2-propenoic acid, sodium salt) superabsorbent polymers was prepared as described in Example 8 except that various water/methanol ratios were used in the saponification process.

The results summarized in Table 9 show that significant improvements in color, when compared to Comparative Example 2, are obtainable over a wide range of water/methanol ratios.

TABLE 7

| Sample | Pre-Saponification Additive Identification | % (1) | Post-Saponification Additive Identification | % (1) | Reaction Temp. °C. | Hunter Color Value L | YI |
|---|---|---|---|---|---|---|---|
| 20 | Sodium Hydrosulfite | 0.146 | Hydrogen Peroxide | 8.03 | 50 | 92.1 | 23.0 |
| 21 | Sodium Hydrosulfite | 0.730 | Hydrogen Peroxide | 8.03 | 50 | 93.7 | 13.9 |
| 22 | Sodium Hydrosulfite | 1.46 | Hydrogen Peroxide | 8.03 | 50 | 93.7 | 14.2 |
| 23 | Sodium Hydrosulfite | 10.22 | Hydrogen Peroxide | 8.03 | 50 | 95.3 | 7.5 |
| 24 | Sodium Hydrosulfite | 1.46 | Hydrogen Peroxide | 2.92 | 50 | 93.1 | 16.0 |
| 25 | Sodium Hydrosulfite | 1.46 | Hydrogen Peroxide | 14.60 | 50 | 93.7 | 12.3 |
| 26 | Sodium Hydrosulfite | 1.46 | Sodium Peroxide | 18.54 | 50 | 92.4 | 15.7 |
| 27 | Sodium Hydrosulfite | 1.46 | Benzoyl Peroxide | 57.2 | 50 | 92.4 | 21.2 |
| 28 | Sodium Hydrosulfite | 1.46 | Potassium Monopersulfate | 35.77 | 70 | 91.0 | 28.4 |
| 29 | Sodium Hydrosulfite | 3.43 | Sodium Perborate | 5.84 | 50 | 92.3 | 18.3 |
| 30 | Sodium Hydrosulfite | 3.36 | Ammonium Persulfate | 4.38 | 70 | 93.6 | 17.0 |

(1) % based on the starch-graft-poly(2-propenenitrile) dry solids

TABLE 9

| Sample | H₂O/MeOH (1) | Pre-Saponification Additive Identification | % (2) | Post-Saponification Additive Identification | % (2) | Reaction Temp. °C. | Hunter Color Value L | YI |
| --- | --- | --- | --- | --- | --- | --- | --- | --- |
| 35 | 59/41 | Sodium Hydrosulfite | 3.43 | Hydrogen Peroxide | 8.09 | 50 | 94.1 | 12.5 |
| 36 | 47/53 | Sodium Hydrosulfite | 2.92 | Hydrogen Peroxide | 8.03 | 50 | 94.8 | 11.4 |
| 37 | 41/59 | Sodium Hydrosulfite | 2.92 | Hydrogen Peroxide | 8.09 | 50 | 95.1 | 9.8 |

(1) w/w basis
(2) % based on the starch-graft-poly(2-propenenitrile) dry solids

EXAMPLE 11

A series of starch-graft-poly(2-propenamide-co-2-propenoic acid, sodium salt) superabsorbent polymers was prepared in a manner similar to that described in Example 8 except that the starch to 2-propenenitrile ratio employed in the graft copolymerization reaction was varied as indicated in Table 10.

The results summarized in Table 10 show that exceptionally white products can be produced over a wide range of starch to 2-propenenitrile ratios when compared to Comparative Example 2.

TABLE 10

| Sample | ST/PN (1) | Cross-linked | Pre-Saponification Additive Identification | % (2) | Post-Saponification Additive Identification | % (2) | Reaction Temp. °C. | Hunter Color Value L | YI |
| --- | --- | --- | --- | --- | --- | --- | --- | --- | --- |
| 38 | 2/1 | No | Sodium Hydrosulfite | 2.97 | Hydrogen Peroxide | 8.55 | 50 | 94.7 | 14.7 |
| 39 | 1/1 | No | Sodium Hydrosulfite | 3.37 | Hydrogen Peroxide | 8.09 | 50 | 93.6 | 17.1 |
| 40 | 1/2 | Yes | Sodium Hydrosulfite | 1.46 | Hydrogen Peroxide | 8.09 | 50 | 93.8 | 12.8 |
| 41 | 1/9 | Yes | Sodium Hydrosulfite | 1.68 | Hydrogen Peroxide | 9.40 | 50 | 93.0 | 22.2 |

(1) Starch/2-propenenitrile ratio
(2) % based on the starch-graft-poly(2-propenenitrile) dry solids

EXAMPLE 12

A starch-graft-poly(2-propenamide-co-2-propenoic acid, sodium salt) superabsorbent copolymer was prepared as described in Example 8 except that the crosslinking monomer was omitted.

The Hunter Color Values obtained on this product (See Table 11) indicate that the significant improvement in product color is independent of crosslinking.

TABLE 11

| Sample | Pre-Saponification Additive Identification | % (1) | Post-Saponification Additive Identification | % (1) | Reaction Temp. °C. | Hunter Color Value L | YI |
| --- | --- | --- | --- | --- | --- | --- | --- |
| 42 | Sodium Hydrosulfite | 3.36 | Hydrogen Peroxide | 8.03 | 50 | 94.0 | 15.2 |

(1) % based on the starch-graft-poly(2-propenenitrile) dry solids

EXAMPLE 13

A starch-graft-poly(2-propenamide-co-2-propenoic acid, sodium salt) superabsorbent copolymer was prepared in the manner described in Example 12 except that α-starch (pasted) was used in place of granular starch. The Hunter Color Values on this product showed a luminosity (L) of 94.1 and a yellowness index (YI) of 16.1 indicating that the significant improvement in color is independent of the physical form of the starting starch material.

EXAMPLE 14

A starch-graft-poly(2-propenamide-co-2-propenoic acid, sodium salt) superabsorbent copolymer was prepared using the general procedures outlined in Comparative Example 2 with the following exceptions:

1. The saponification was carried out in an aqueous environment as opposed to the previously used aqueous methanol system.

2. Sodium hydrosulfite [1.4% on the starch-graft-poly(2propenenitrile)] was added prior to saponification.

3. Hydrogen peroxide [5.5% actual based on the starch-graft-poly(2-propenenitrile)] was added after saponification using the procedure described in Example 7.

Results show that the resultant dry product had a Hunter Color Difference Meter luminosity (L) of 87.6 and a yellowness index (YI) of only 10.4 which is a significant improvement over the product prepared in accordance with Comparative Example 2.

EXAMPLE 15

A white starch-graft-poly(2-propenamide-co-2-propenoic acid, sodium salt) superabsorbent copolymer was prepared using the general conditions described below.

An aqueous starch-graft-poly(2-propenenitrile) copolymer slurry (12.3% copolymer solids based upon the total slurry weight), prepared using procedures known to those skilled in the art, was treated with 7.90% sodium hydroxide (added as an aqueous 50% solution, w/w), 1.38% sodium hydrosulfite [both based on starch-graft-poly(2-propenenitrile) dry solids] and 100% methanol (based upon the original graft slurry weight). The slurry was saponified as described in Comparative Example 2.

After saponification the slurry was washed with alcohol to a supernatant specific gravity of about 0.87 and then treated with 3.01% hydrogen peroxide [added as an aqueous 30% solution, w/w; % based on starch-graft-poly(2-propenenitrile) dry solids] for 30 minutes at a temperature of about 52° C. At the end of the reaction period the product was recovered as described earlier.

The resultant dry product had a Hunter Color Difference Meter luminosity (L) of 93.6 and a yellowness index (YI) of 13.8 Both values are significantly better than noted for Comparative Example 2.

EXAMPLE 16

A starch-graft-poly(2-propenamide-co-2-propenoic acid, sodium salt) superabsorbent copolymer was prepared using the following general procedures:

An aqueous starch-graft-poly(2-propenenitrile-co-2-propenamide) copolymer slurry (12.9%) polymer solids based upon total graft slurry weight), prepared using procedures known to those skilled in the art, was treated with 10.69% sodium hydroxide (added as an aqueous 36.4% solution w/w) and 106.6% methanol (both percentages based upon the graft slurry weight). The resultant reaction slurry was saponified and recovered as described in Comparative Example 2.

In a second experiment the starch graft copolymer slurry was treated with 1.61% sodium hydrosulfite [% based on starch-graft-poly(2-propenenitrile-co-2-propenamide) dry solids] prior to saponification.

| Sample | Sodium Hydrosulfite Weight | Hunter Color L | YI |
|---|---|---|---|
| 43 | 1.61 | 87 | 28 |
| 44 | 0 | 82 | 43 |

Results summarized above show the color of saponified starch graft copolymers of 2-propenenitrile and 2-propenamide benefit from the bleaching procedures described herein.

EXAMPLE 17

A white starch-graft-poly(2-propenamide-co-2-propenoic acid, sodium salt) superabsorbent copolymer was prepared using the procedures described in Example 15 except the saponification slurry was treated with varying amounts of hydrogen peroxide using procedures described in Example 2.

Results summarized in the following table show that white superabsorbent polymers can be prepared using a wide range of hydrogen peroxide use levels. In all cases, the treated polymers were significantly whiter than noted for the product from Comparative Example 2.

| Sample | Hydrogen Peroxide Use Level % (1) | Hunter Color Value L | YI |
|---|---|---|---|
| 45 | 8.0 | 94.9 | 10.4 |
| 46 | 5.80 | 92.9 | 9.8 |
| 47 | 1.34 | 93.5 | 15.2 |
| 48 | 0.96 | 93.0 | 14.0 |
| 49 | 0.57 | 92.6 | 15.1 |

(1) % based upon starch-graft-poly(2-propenenitrile) dry solids

Those modifications and equivalents which fall within the spirit of the invention are to be considered a part thereof.

What is claimed is:

1. In the process of producing a liquid absorbing material wherein a polymer or copolymer or starch graft copolymer consisting substantially of 2-propenenitrile or 2-methyl-2-propenenitrile is saponified with an aqueous base and then dried, the improvement which comprises treating the polymer or copolymer or starch graft copolymer prior to drying to reduce color thereof by a treatment selected from the group consisting of treatments (a), (b), (c), (d) and (e) wherein:

treatment (a) involves use of a reducing agent in the saponification reaction mixture prior to the time the saponification reaction is substantially complete and prior to drying of the saponified product, treatment (b) involves use of a reducing agent in the saponification mixture subsequent to the time the saponification reaction is substantially complete and prior to drying, treatment (c) involves use of a reducing agent in the saponification mixture both prior to and subsequent to substantial completion of the saponification reaction and prior to drying, treatment (d) involves use of a reducing agent in the saponification mixture prior to and/or after substantial completion of the saponification reaction and prior to drying and use of a peroxy oxidizing agent in the saponification mixture after substantial completion of the saponification reaction and prior to drying, and treatment (e) involves use in the saponification mixture of hydrogen peroxide after substantial completion of the saponification reaction and prior to drying.

2. A process in accordance with claim 1 wherein an alcohol is employed with the aqueous base for saponification.

3. A process in accordance with claim 1 wherein treatment (a) is employed.

4. A process in accordance with claim 3 wherein the reducing agent is a sulfoxy compound.

5. A process in accordance with claim 3 wherein the reducing agent is sodium hydrosulfite.

6. A process in accordance with claim 1 wherein treatment (b) is employed.

7. A process in accordance with claim 6 wherein the reducing agent is a sulfoxy compound.

8. A process in accordance with claim 6 wherein the reducing agent is sodium hydrosulfite.

9. A process in accordance with claim 1 wherein treatment (c) is employed.

10. A process in accordance with claim 9 wherein the reducing agent is a sulfoxy compound.

11. A process in accordance with claim 9 wherein the reducing agent is sodium hydrosulfite.

12. A process in accordance with claim 1 wherein treatment (d) is employed.

13. A process in accordance with claim 12 wherein the reducing agent is a sulfoxy compound and the oxidizing agent is a peroxide.

14. A process in accordance with claim 12 wherein the reducing agent is sodium hydrosulfite and the oxidizing agent is hydrogen peroxide.

15. A process in accordance with claim 1 wherein treatment (e) is employed.

16. A liquid absorbing material comprising a saponified polymer or copolymer or starch graft copolymer consisting substantially of 2-propenenitrile or 2-methyl-2-propenenitrile having a luminosity value of not less than 90.0 and/or a yellowness index not greater than 26.0 as determined by using a Hunter Color Difference Meter Model D25-2.

* * * * *